US007478184B2

(12) United States Patent
Kume

(10) Patent No.: US 7,478,184 B2

(45) Date of Patent: Jan. 13, 2009

(54) INTEGRATED CIRCUIT DEVICE INCLUDING PROCESSOR SELECTION IN A MULTIPROCESSOR SYSTEM

(75) Inventor: Takayuki Kume, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 83 days.

(21) Appl. No.: 10/857,985

(22) Filed: Jun. 2, 2004

(65) Prior Publication Data

US 2005/0144435 A1 Jun. 30, 2005

(30) Foreign Application Priority Data

Dec. 25, 2003 (JP) ............................ 2003-430109

(51) Int. Cl.
*G06F 13/14* (2006.01)

(52) U.S. Cl. ............................ 710/240; 713/2; 712/43

(58) Field of Classification Search ............ 712/28–30, 712/43; 713/2; 710/104, 240
See application file for complete search history.

(56) References Cited

U.S. PATENT DOCUMENTS 5,737,615 A * 4/1998 Tetrick ...................... 713/324
6,550,020 B1 * 4/2003 Floyd et al. .................. 714/10
6,615,380 B1 * 9/2003 Kapur et al. ................ 714/738
6,662,253 B1 * 12/2003 Gary et al. .................. 710/244

FOREIGN PATENT DOCUMENTS

EP 0071727 2/1983
JP 62-168258 7/1987
JP 10-083320 3/1998
JP 11-007344 1/1999
WO 03/005225 1/2003

OTHER PUBLICATIONS

Japanese Office Action dated May 7, 2008 for corresponding Japanese Patent Application 2003-430109.

* cited by examiner

*Primary Examiner*—Alford W. Kindred
*Assistant Examiner*—Benjamin Geib
(74) *Attorney, Agent, or Firm*—Staas & Halsey LLP

(57) ABSTRACT

An integrated circuit device in which a CPU not to be used of a plurality of CPUs formed on one chip can easily be disconnected by an external signal in order to reduce the costs of developing an LSI. In accordance with a CPU selection signal inputted from the outside, a decoder generates an internal selection signal for selecting a CPU to be operated and sends the internal selection signal to the plurality of CPUs. Only the selected CPU can perform valid access to a bus to use peripheral modules.

2 Claims, 7 Drawing Sheets

10b
CPU SELECTION SIGNAL
15
2
DECODER
CPU OPERATION STOP INSTRUCTION SIGNAL
18
DECODER
11
12
CPU
CPU
17
13
BUS
PERIPHERAL MODULE
PERIPHERAL MODULE
PERIPHERAL MODULE
....
PERIPHERAL MODULE
14-1
14-2
14-3
14-n

INTEGRATED CIRCUIT DEVICE INCLUDING PROCESSOR SELECTION IN A MULTIPROCESSOR SYSTEM

CROSS-REFERENCE TO RELATED APPLICATIONS

This application is based upon and claims the benefits of priority from the prior Japanese Patent Application No. 2003-430109, filed on Dec. 25, 2003, the entire contents of which are incorporated herein by reference.

BACKGROUND OF THE INVENTION (1) Field of the Invention

This invention relates to an integrated circuit device and, more particularly, to an integrated circuit device with a plurality of central processing units on one chip.

(2) Description of the Related Art

It is known that there are various specifications for central processing units (CPUs) included in general-purpose microcontrollers, microcomputers, and the like.

That is to say, specifications for such CPUs differ as to, for example, cache size, whether a memory management unit (MMU) or a memory protection unit (MPU) is included, whether a Java (registered trademark) accelerator is included, and whether a floating-point operation unit is included.

If CPU specifications differ, then operating systems (OSes) and the like under which CPUs can operate also differ. Therefore, one-chip large-scale integrated circuits (LSIs) have conventionally been developed and provided according to CPU specifications to meet customers' needs.

In addition, techniques, such as a dual CPU system, for forming a plurality of CPUs on one chip are disclosed (see, for example, Japanese Unexamined Patent Publication No. 58-58672, FIG. 1).

FIG. 7 shows a lineup of conventional LSIs.

Specifications for CPUs 51*a* and 51*b* differ. The same peripheral circuits (peripheral modules) 53-1, 53-2, and 53-3 are connected to a bus 52*a* on chip A, a bus 52*b* on chip B, and a bus 52*c* on chip C. The peripheral modules 53-1, 53-2, and 53-3 are a timer, an interrupt controller, and the like.

As shown in FIG. 7, three kinds of LSI chips (chips A, B, C) are developed according to CPU specifications. The two CPUs 51*a* and 51*b* are formed on the chip C, which is referred to as a dual CPU system.

SUMMARY OF THE INVENTION

In the present invention, an integrated circuit device with a plurality of central processing units on one chip is provided. This integrated circuit device comprises a plurality of peripheral circuits connected to the plurality of central processing units via a bus and an internal selection signal generation decoder for generating, in accordance with an external selection signal inputted from the outside, an internal selection signal for selecting one of the plurality of central processing units which is to be operated and for sending the internal selection signal to the plurality of central processing units.

The above and other features and advantages of the present invention will become apparent from the following description when taken in conjunction with the accompanying drawings which illustrate preferred embodiments of the present invention by way of example.

DESCRIPTION OF THE PREFERRED EMBODIMENTS

As semiconductor device manufacturing processes become minuter, in recent years the costs of manufacturing LSIs, including the costs of making masks, reticles, and the like, have tremendously increased. Accordingly, the development of many kinds of products described in "Description of the Related Art" is difficult.

Figure 7:
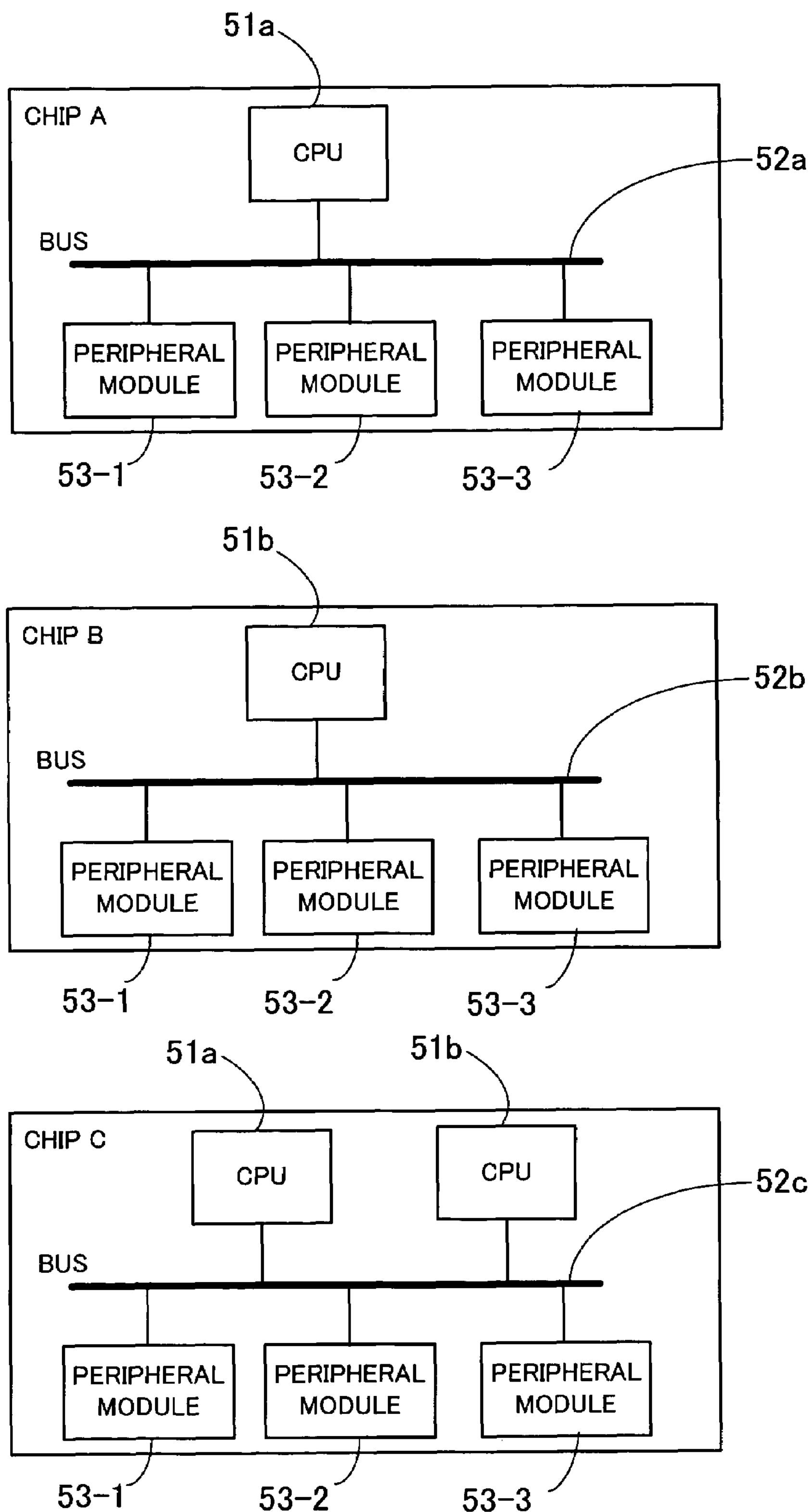
FIG. 7 shows a lineup of conventional LSIs.

Moreover, with the conventional technique for forming a plurality of CPUs on one chip which is disclosed in Japanese Unexamined Patent Publication No. 58-58672, some customers may need the function of a CPU and may not need the functions of the other CPUs. In such a case, it makes no sense to operate the plurality of CPUs. However, all of the plurality of CPUs have conventionally been put into an operable state and it has been difficult to disconnect a CPU which is not to be used. That is to say, it is difficult to use the chip C shown in FIG. 7 in place of the chip A or B.

The present invention was made in order to solve such problems. An object of the present invention is to provide an integrated circuit device in which a CPU not to be used of a plurality of CPUs formed on one chip can easily be disconnected by an external signal in order to reduce the costs of developing an LSI.

Embodiments of the present invention will now be described in detail with reference to the drawings.

Figure 1:
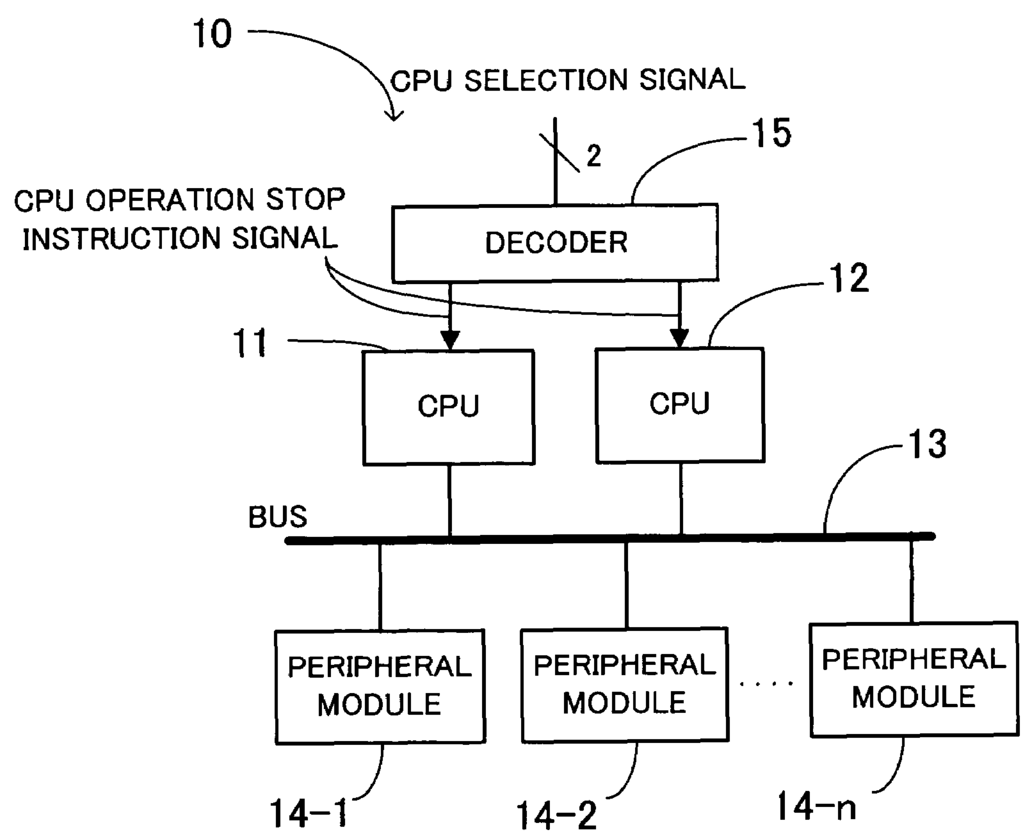
FIG. 1 shows the structure of an integrated circuit device according to a first embodiment of the present invention.

FIG. 1 shows the structure of an integrated circuit device according to a first embodiment of the present invention.

An integrated circuit device 10 according to the first embodiment of the present invention comprises two CPUs 11 and 12 formed on one chip, a plurality of peripheral modules 14-1, 14-2, . . . , and 14-n connected to the CPUs 11 and 12 via a bus 13, and a decoder 15 for generating an internal selection signal for selecting the CPU 11 and/or the CPU 12 to be operated in accordance with a 2-bit CPU selection signal inputted from the outside.

The CPUs 11 and 12 control the peripheral modules 14-1, 14-2, . . . , and 14-n.

The peripheral modules 14-1, 14-2, . . . , and 14-n are an interrupt controller, a timer, a clock controller, a memory controller, and the like.

The decoder 15 generates an internal selection signal for selecting the CPU 11 or 12 to be operated in accordance with the 2-bit CPU selection signal inputted from an external terminal (not shown). To be concrete, the decoder 15 generates a CPU operation stop instruction signal and sends it to a CPU which is not to be operated.

For example, if the CPU selection signal is "01," then the CPU operation stop instruction signal is sent to the CPU 11 in order to operate only the CPU 12. If the CPU selection signal is "10," then the CPU operation stop instruction signal is sent to the CPU 12 in order to operate only the CPU 11. If the CPU selection signal is "11," then the CPU operation stop instruction signal is not generated in order to operate both the CPUs 11 and 12.

The operation of the integrated circuit device 10 according to the first embodiment of the present invention will now be described.

When the CPU selection signal is inputted from the external terminal (not shown), this signal is inputted to the decoder 15. The decoder 15 decodes the CPU selection signal, generates the CPU operation stop instruction signal, and sends it to the CPU 11 or 12 which is not to be operated.

The CPU 11 or 12 which has received the CPU operation stop instruction signal does not perform valid access to the bus 13.

As described above, according to the first embodiment of the present invention, the decoder 15 generates a signal for selecting the CPU 11 and/or the CPU 12 to be operated in accordance with a CPU selection signal inputted from the outside. Only the selected CPU performs valid access to the bus 13 and can use the peripheral modules 14-1, 14-2, . . . , and 14-n. By fixing the CPU selection signal, the integrated circuit device 10 including the CPUs 11 and 12 on the one chip can be used as a single-CPU system or a multi-CPU system. Therefore, the integrated circuit device 10 is susceptible of wide application. For example, by mounting the integrated circuit device 10 on an evaluation board, a plurality of CPUs can be evaluated by the one chip.

In the above example, two CPUs are formed on the one chip. However, three or more CPUs may be formed on the one chip.

In the above integrated circuit device 10 according to the first embodiment of the present invention, it is assumed that each of the CPUs 11 and 12 has an operation stop function at the time of receiving a CPU operation stop instruction signal.

However, some CPUs do not have such an operation stop function. When instructions to stop operation are given, these CPUs may output an indefinite signal to a bus. An integrated circuit device according to a second embodiment of the present invention which can solve this problem will now be described.

Figure 2:
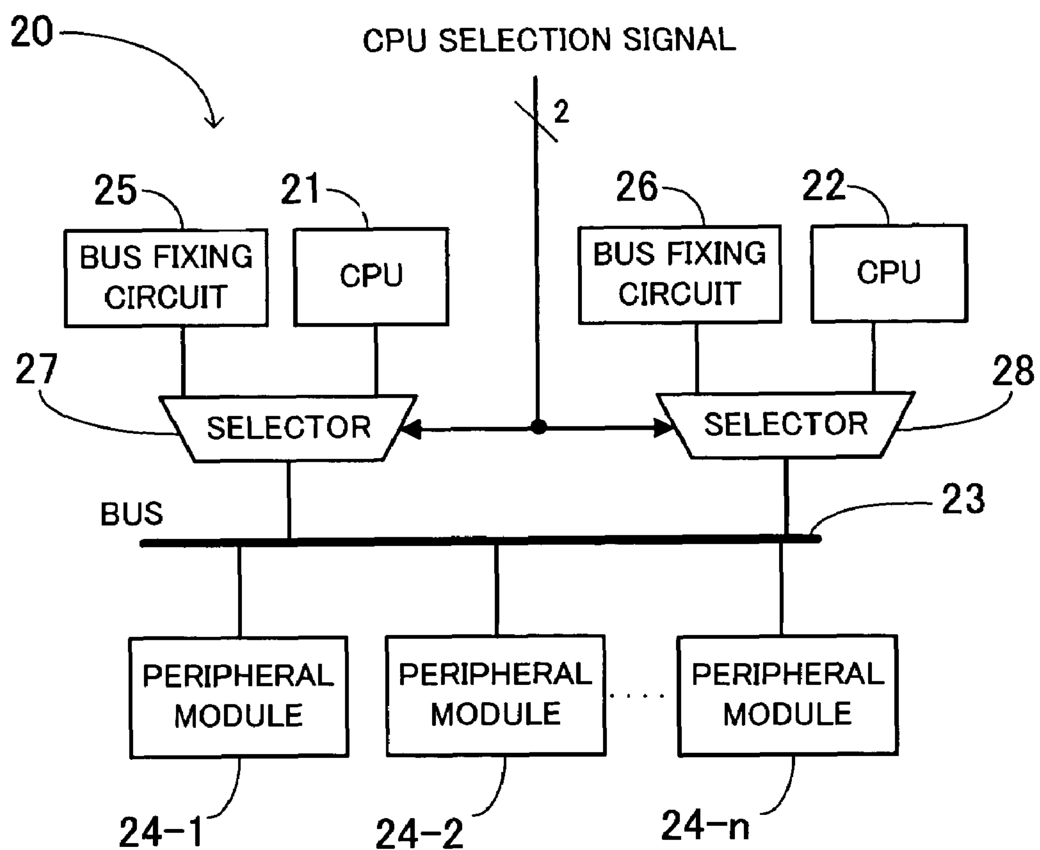
FIG. 2 shows the structure of an integrated circuit device according to a second embodiment of the present invention.

FIG. 2 shows the structure of an integrated circuit device according to a second embodiment of the present invention.

An integrated circuit device 20 according to the second embodiment of the present invention comprises two CPUs 21 and 22 formed on one chip, a plurality of peripheral modules 24-1, 24-2, . . . , and 24-*n* connected to a bus 23, bus fixing circuits 25 and 26 for invalidating access by the CPUs 21 and 22, respectively, to the bus 23, a bus connection selector (hereinafter simply referred to as a selector) 27 for selecting the CPU 21 or the bus fixing circuit 25 in accordance with a CPU selection signal and connecting it to the bus 23, and a bus connection selector (hereinafter simply referred to as a selector) 28 for selecting the CPU 22 or the bus fixing circuit 26 in accordance with the CPU selection signal and connecting it to the bus 23.

The CPUs 21 and 22 do not have an operation stop function at the time of receiving a CPU operation stop instruction signal. The peripheral modules 24-1, 24-2, . . . , and 24-*n* are the same as those included in the integrated circuit device 10 according to the first embodiment of the present invention, so descriptions of them will be omitted.

The bus fixing circuits 25 and 26 invalidate access to the bus 23 so that the bus 23 will not be accessed illegally. For example, the bus fixing circuits 25 and 26 output zero to an address bus or invalidate a control signal for performing access to a bus.

The selector 27 chooses in accordance with the CPU selection signal inputted from an external terminal (not shown) whether to connect the CPU 21 or the bus fixing circuit 25 to the bus 23. The selector 28 chooses in accordance with the CPU selection signal inputted from the external terminal (not shown) whether to connect the CPU 22 or the bus fixing circuit 26 to the bus 23.

The operation of the integrated circuit device 20 according to the second embodiment of the present invention will now be described.

When the 2-bit CPU selection signal is inputted from the external terminal (not shown), this signal is inputted to the selectors 27 and 28. For example, if the CPU selection signal is "01," then only the CPU 22 should be connected to the bus 23 and be operated. Accordingly, the selector 27 selects the bus fixing circuit 25 and connects it to the bus 23 so that the CPU 21 will not perform valid access to the bus 23. On the other hand, the selector 28 selects the CPU 22 and connects it to the bus 23 so that it will perform valid access to the bus 23. If the CPU selection signal is "10," then only the CPU 21 should be connected to the bus 23 and be operated. Accordingly, the selector 28 selects the bus fixing circuit 26 and connects it to the bus 23 so that the CPU 22 will not perform valid access to the bus 23. On the other hand, the selector 27 selects the CPU 21 and connects it to the bus 23 so that it will perform valid access to the bus 23. If the CPU selection signal is "11," then both the CPUs 21 and 22 should be operated. Accordingly, the selector 27 selects the CPU 21 and connects it to the bus 23. On the other hand, the selector 28 selects the CPU 22 and connects it to the bus 23. As a result, both the CPUs 21 and 22 will perform valid access to the bus 23.

As described above, with the integrated circuit device 20 according to the second embodiment of the present invention, the CPU 21 or 22 not to be used can be disconnected easily in accordance with a CPU selection signal inputted from the outside even if they do not have an operation stop function.

In the above example, two CPUs are formed on the one chip. However, three or more CPUs may be formed on the one chip. In that case, the number of selectors and the number of bus fixing circuits should be the same as that of CPUs.

With the above-mentioned integrated circuit device 10 according to the first embodiment of the present invention, the following signal switching selector will be needed when a clock stop request signal, an interrupt request signal, or the like is sent between the CPUs 11 and 12 and the peripheral modules 14-1, 14-2, . . . , and 14-n without using the bus 13. The same applies to the integrated circuit device 20 according to the second embodiment of the present invention.

Figure 3:
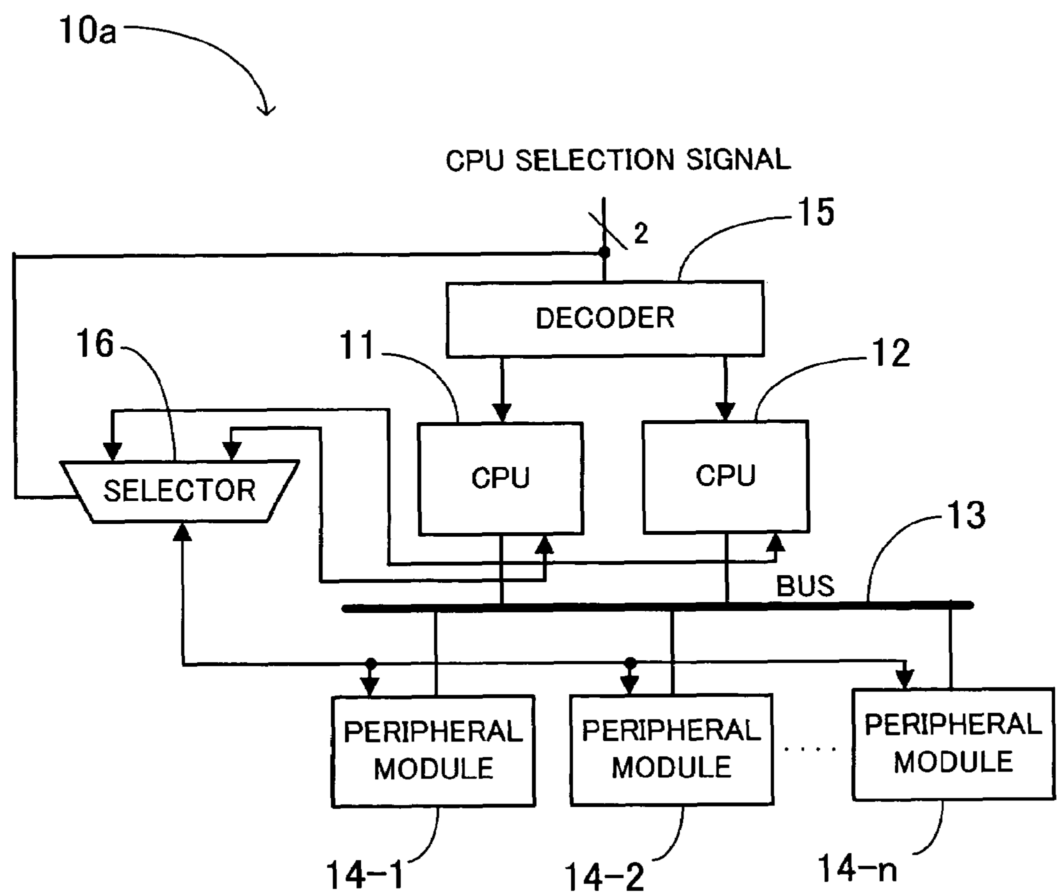
FIG. 3 shows the structure of an integrated circuit device including a signal switching selector for switching a CPU which communicates with a peripheral module.

FIG. 3 shows the structure of an integrated circuit device including a signal switching selector for switching a CPU which communicates with a peripheral module.

An integrated circuit device 10*a* shown in FIG. 3 is obtained by locating a signal switching selector (hereinafter simply referred to as a selector) 16 in the integrated circuit device 10 according to the first embodiment of the present invention shown in FIG. 1. The selector 16 switches the CPU 11 or 12 in accordance with a 2-bit CPU selection signal to communicate with each of the peripheral modules 14-1, 14-2, . . . , and 14-n.

By adopting such structure, the CPU 11 or 12 to be operated is selected. As a result, an interrupt request signal, a clock stop request signal, or the like can be sent between the selected CPU 11 or 12 and the peripheral modules 14-1, 14-2, . . . , and 14-n without using the bus 13.

In this example, the selector 16 is applied to the integrated circuit device 10 according to the first embodiment of the present invention. However, the selector 16 can be applied to the integrated circuit device 20 according to the second embodiment of the present invention in the same way.

In an integrated circuit device with a plurality of CPUs formed on one chip which includes a peripheral module to be used only by a particular CPU, a case where the plurality of CPUs are operated will now be described.

Figure 4:
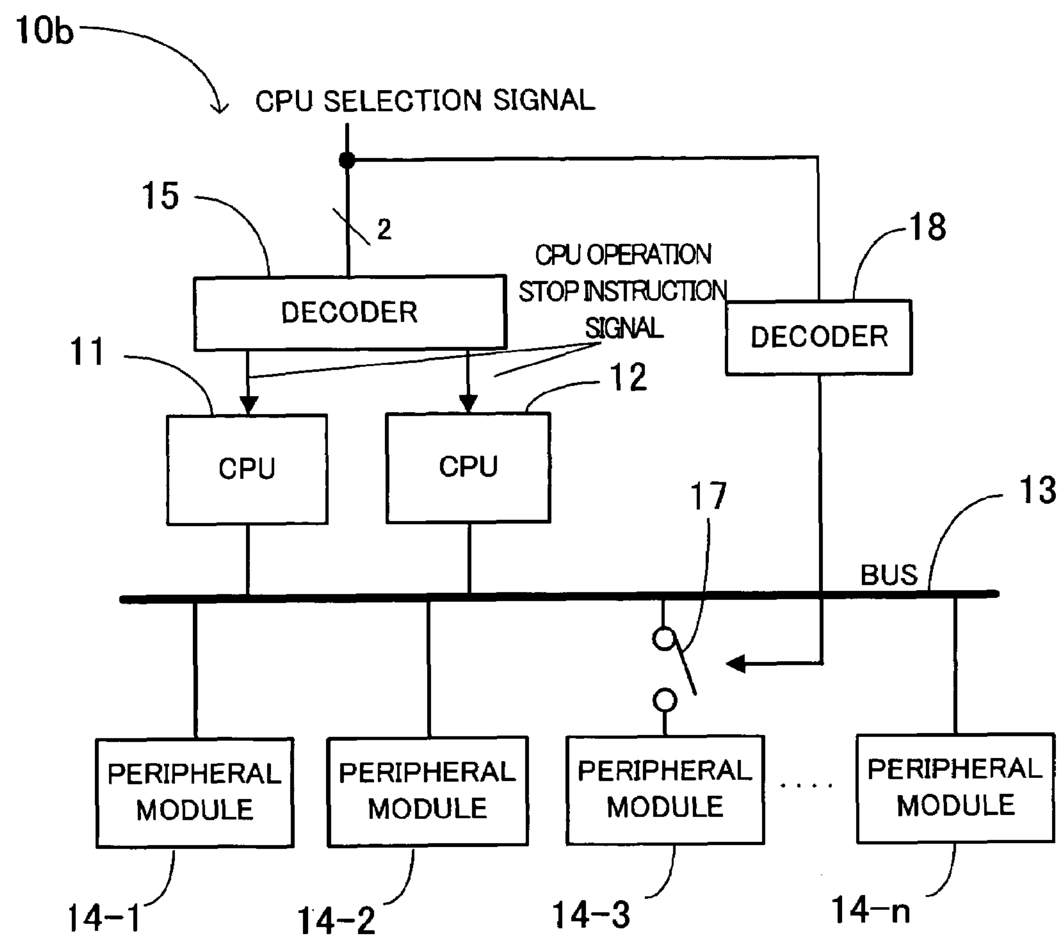
FIG. 4 shows the structure of an integrated circuit device including a peripheral module to be used only by a particular CPU at the time of the operation of a plurality of CPUs.

FIG. 4 shows the structure of an integrated circuit device including a peripheral module to be used only by a particular CPU at the time of the operation of a plurality of CPUs.

An integrated circuit device 10*b* shown in FIG. 4 is obtained by locating a connection unit(hereinafter referred to as a switch) 17 between the peripheral module 14-3 to be used only by a particular CPU (the CPU 12, for example) and the bus 13 and a bus connection signal generation decoder (hereinafter simply referred to as a decoder) 18 for sending the connection 17 a signal for connecting the peripheral module 14-3 and the bus 13 only in the case of operating the two CPUs 11 and 12 at the same time in accordance with a CPU selection signal inputted from the outside in the integrated circuit device 10 according to the first embodiment of the present invention shown in FIG. 1.

The peripheral module 14-3 is, for example, an interrupt controller.

The operation of the integrated circuit device 10*b* will now be described.

When a 2-bit CPU selection signal is inputted from the external terminal (not shown), the decoder 15 generates a CPU operation stop instruction signal on the basis of the CPU selection signal and sends it to a CPU which is not to be operated. For example, if the CPU 11 is not to be operated, then the decoder 15 generates an operation stop instruction signal and sends it to the CPU 11. If the CPU 12 is not to be operated, then the decoder 15 generates an operation stop instruction signal and sends it to the CPU 12. If the plurality of CPUs, that is to say, the CPUs 11 and 12 are to be operated at the same time, then the decoder 18 turns on the switch 17. If only one of the CPUs 11 and 12 is to be operated, then the decoder 18 turns off the switch 17.

As a result, when only one of the CPUs 11 and 12 operates, the peripheral module 14-2, for example, which is an interrupt controller is used. When the CPUs 11 and 12 are operated at the same time, the CPU 11 uses the peripheral module 14-2 which is an interrupt controller, and the CPU 12 uses the peripheral module 14-3 which is an interrupt controller.

As stated above, when the CPUs 11 and 12 are used at the same time, only the CPU 12, for example, can use the peripheral module 14-3. This is convenient.

A selector may be located in place of the switch 17. In this case, a bus fixing circuit like the one shown in FIG. 2 can be connected to the bus 13 instead of turning off the switch.

In this example, the switch 17 and the decoder 18 are applied to the integrated circuit device 10 according to the first embodiment of the present invention. However, the switch 17 and the decoder 18 can be applied to the integrated circuit device 20 according to the second embodiment of the present invention in the same way.

In addition, in this example two CPUs are formed on the one chip. However, three or more CPUs may be formed on the one chip.

An integrated circuit device with a plurality of CPUs connected in series on one chip in which a CPU not to be used can be disconnected by an external signal will now be described.

A scan chain circuit and a JTAG chain circuit, being test circuits, are known as integrated circuit devices with a plurality of CPUs connected in series.

Figure 5:
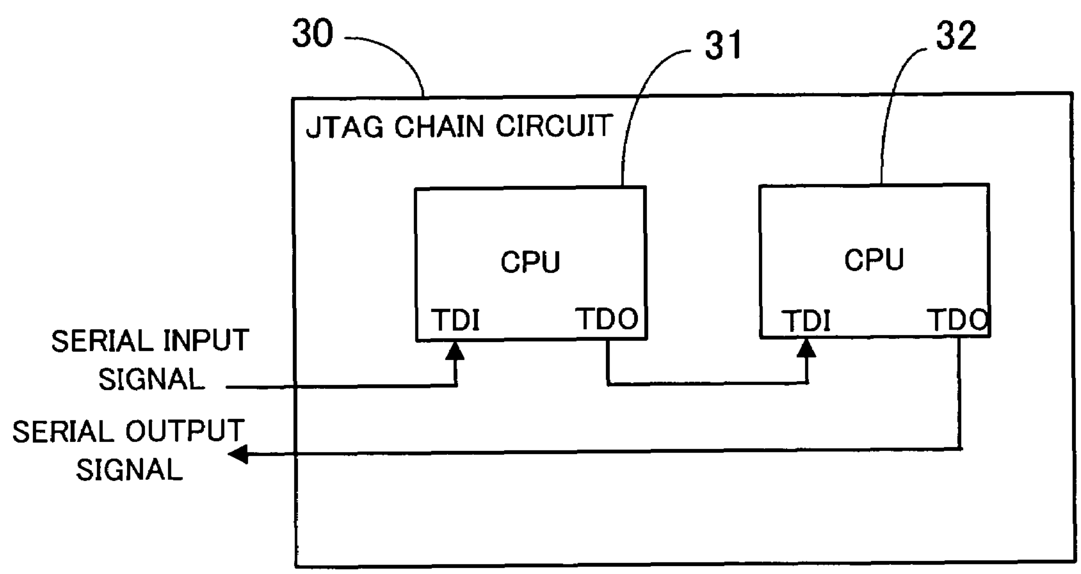
FIG. 5 is a schematic view showing a conventional JTAG chain circuit.

FIG. 5 is a schematic view showing a conventional JTAG chain circuit.

As shown in FIG. 5, a JTAG chain circuit 30 includes CPUs 31 and 32 connected in series. In each of the CPUs 31 and 32, a serial input signal is inputted from the outside to an input terminal TDI and is outputted from an output terminal TDO. That is to say, output signal from the output terminal TDO of the CPU 31 is inputted to the input terminal TDI of the CPU 32 and output signal from the output terminal TDO of the CPU 32 is taken out of the JTAG chain circuit 30 as a serial output signal. In addition to the input terminal TDI and the output terminal TDO, each of the CPUs 31 and 32 has terminals, such as the one for inputting a clock signal, but these terminals are not shown.

An integrated circuit device according to an embodiment of the present invention which includes a plurality of CPUs connected in series in this way and in which a CPU can be disconnected in accordance with a CPU selection signal inputted from the outside is as follows.

Figure 6:
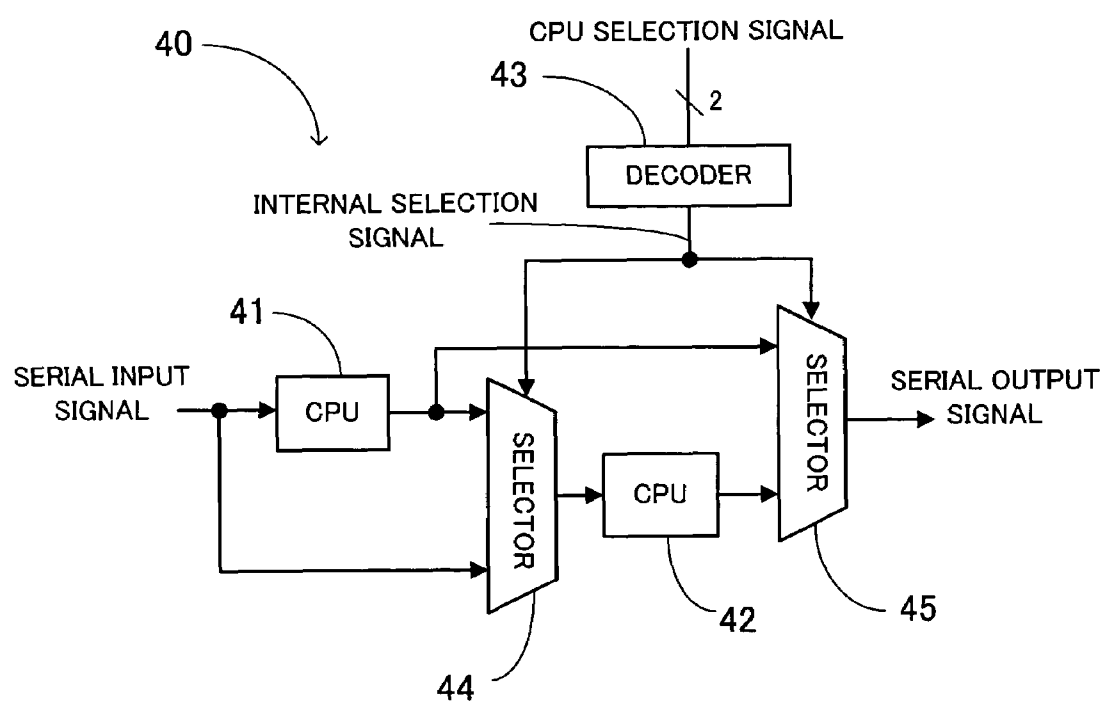
FIG. 6 shows the structure of an integrated circuit device in which one of CPUs connected in series can be disconnected.

FIG. 6 shows the structure of an integrated circuit device in which one of CPUs connected in series can be disconnected.

An integrated circuit device 40 includes two CPUs 41 and 42 connected in series, an internal selection signal generation decoder (hereinafter simply referred to as a decoder) 43 for generating an internal selection signal for selecting the CPU 41 or 42 to be operated in accordance with a CPU selection signal inputted from the outside, and signal switching selectors (hereinafter simply referred to as selectors) 44 and 45.

Each of the selectors 44 and 45 has the function of selecting a signal outputted from one of a plurality of CPUs located at stages before it in accordance with the internal selection signal and of outputting the signal to a CPU at the following stage. As shown in FIG. 6, the two CPUs 41 and 42 are included. In this case, the selector 44 selects one of a signal outputted from the CPU 41 at the preceding stage and a serial input signal inputted from the outside (the serial input signal is equivalent to a signal outputted from the stage just before the CPU 41) and outputs it to the CPU 42 at the following stage. The selector 45 selects a signal outputted from one of the CPUs 41 and 42 located at stages before it in accordance with the internal selection signal and outputs it to the following stage (outside) as a serial output signal.

The operation of the integrated circuit device 40 will now be described.

It is assumed that instructions to select only the CPU 41 are given by the CPU selection signal inputted from an external terminal (not shown). Then the decoder 43 generates the internal selection signal for giving instructions to select a signal outputted from the CPU 41 and sends it to the selectors 44 ad 45. The selector 44 receives this internal selection signal, selects the signal outputted from the CPU 41, and outputs it to the CPU 42 at the following stage. The selector 45 selects the signal outputted from the CPU 41 and outputs it to the outside as a serial output signal.

If instructions to select only the CPU 42 are given by the CPU selection signal inputted, then the decoder 43 generates the internal selection signal for giving instructions to select a signal outputted from the CPU 42 and sends it to the selectors 44 and 45. The selector 44 receives this internal selection signal, selects the serial input signal inputted from the outside, and outputs it to the CPU 42 at the following stage. In this case, the selector 44 does not select a signal outputted from the CPU 41. The selector 45 selects the signal outputted from the CPU 42 and outputs it to the outside as a serial output signal.

It is assumed that instructions to select both the CPUs 41 and 42 are given by the CPU selection signal inputted. Then the decoder 43 generates the internal selection signal for giving instructions to select a signal outputted from the CPU 41 and sends it to the selector 44. In addition, the decoder 43 generates the internal selection signal for giving instructions to select a signal outputted from the CPU 42 at the preceding stage of the CPUs 41 and 42 and sends it to the selector 45. The selector 44 receives the internal selection signal, selects the signal outputted from the CPU 41, and outputs it to the CPU 42 at the following stage. The CPU 42 accepts the signal outputted from the CPU 41 and inputs a result obtained by operating on the basis of the signal to the selector 45 as a signal outputted from the CPU 42. The selector 45 receives the internal selection signal sent from the decoder 43, selects the signal outputted from the CPU 42, and outputs it to the outside as a serial output signal.

In the above example, the two CPUs 41 and 42 are formed on the one chip. However, three or more CPUs may be formed on the one chip. For example, if there are three CPUs on the one chip, then the serial input signal is also inputted to the selector 45. Therefore, one of the serial input signal and the signals outputted from the CPUs 41 and 42 is selected in accordance with an internal selection signal and the selected signal is inputted to a CPU at the following stage.

In the above embodiments, the CPU selection signal inputted from the outside may be changed properly with an external control circuit or the like (not shown) to dynamically switch a CPU to be operated.

The present invention is applicable to, for example, an LSI contained in a general-purpose microcontroller or microcomputer.

With the integrated circuit device according to the present invention, the decoder generates a signal for selecting a CPU to be operated in accordance with a CPU selection signal inputted from the outside and only the selected CPU can perform valid access to the bus to use the peripheral modules. As a result, a CPU not to be used can be disconnected easily and the integrated circuit device including only one chip can be used both as a single-CPU system and as a multi-CPU system. Therefore, the costs of developing an LSI can be reduced.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An integrated circuit device with a plurality of central processing units on one chip, the device comprising:

a plurality of peripheral circuits connected to the plurality of central processing units via a bus;

an internal selection signal generation decoder for generating, in accordance with an external selection signal inputted from outside of the device, an internal selection signal for selecting one of the plurality of central processing units which is to be operated and for sending the internal selection signal to the plurality of central processing units;

a connection unit located between one of the plurality of peripheral circuits to be used only by a particular central processing unit of the plurality of central processing units and the bus; and a bus connection signal generation decoder for sending the connection unit a signal for connecting the peripheral circuit to be used only by the particular central processing unit and the bus only in the case of operating the plurality of central processing units at the same time in accordance with the external selection signal.

2. An integrated circuit device with a plurality of central processing units on one chip, the device comprising:

a plurality of peripheral circuits connected to a bus;

a plurality of bus fixing circuits for invalidating access by the plurality of central processing units to the bus;

a plurality of bus connection selectors for selecting the central processing unit or the bus fixing circuit in accordance with an external selection signal inputted from outside the device and for connecting the selected central processing unit or bus fixing circuit to the bus;

a connection unit located between one of the plurality of peripheral circuits to be used only by a particular central processing unit of the plurality of central processing units and the bus; and a bus connection unit signal generation decoder for sending the connection unit a signal for connecting the peripheral circuit to be used only by the particular central processing unit and the bus only in the case of operating the plurality of central processing units including the particular central processing unit at the same time in accordance with the external selection signal.

* * * * *